US011538169B2

(12) United States Patent
Graff (10) Patent No.: US 11,538,169 B2
(45) Date of Patent: Dec. 27, 2022

(54) METHOD, COMPUTER PROGRAM AND SYSTEM FOR DETECTING CHANGES AND MOVING OBJECTS IN A VIDEO VIEW

(71) Applicant: Pexip AS, Oslo (NO)

(72) Inventor: Håvard Graff, Oslo (NO)

(73) Assignee: Pexip AS, Oslo (NO)

(*) Notice: Subject to any disclaimer, the term of this patent is extended or adjusted under 35 U.S.C. 154(b) by 0 days.

(21) Appl. No.: 17/349,252

(22) Filed: Jun. 16, 2021

(65) Prior Publication Data
US 2022/0012857 A1 Jan. 13, 2022

(30) Foreign Application Priority Data
Jun. 17, 2020 (NO) .................................. 20200708

(51) Int. Cl.
*G06T 7/11* (2017.01)
*G06T 7/246* (2017.01)
(Continued)

(52) U.S. Cl.
CPC .................. *G06T 7/11* (2017.01); *G06T 5/30* (2013.01); *G06T 7/155* (2017.01); *G06T 7/248* (2017.01);
(Continued)

(58) Field of Classification Search
None
See application file for complete search history.

(56) References Cited

U.S. PATENT DOCUMENTS

2004/0227817 A1* 11/2004 Oya ..................... G06F 3/017
 348/E7.086
2009/0154807 A1* 6/2009 Rossato ................... G06T 7/12
 382/199
(Continued)

FOREIGN PATENT DOCUMENTS

WO 9923600 A1 5/1999
WO 2011005105 A1 1/2011
(Continued)

OTHER PUBLICATIONS

Yang, Zi. "An enhanced three-frame-differencing approach for vehicle detection under challenging environmental conditions.". Hong Kong Polytechnic University—Dissertations, Department of Land Surveying and Geo-Informatics (2019) (Year: 2019).*
(Continued)

*Primary Examiner* — Emily C Terrell
*Assistant Examiner* — Nathan J Bloom
(74) *Attorney, Agent, or Firm* — Christopher & Weisberg, P.A.

(57) ABSTRACT

The present invention relates to an image processing device and a method of framing changes and movements in a video image divided into N×N blocks of pixel positions. The method comprises calculating a first bitmap of the video image by a DCT transform on each of the N×N blocks of pixel positions, assigning a first binary value to the pixel positions of the N×N blocks when more than an amount of change, and a second binary value to the pixel positions of the N×N blocks when less than an amount of change. Calculating a third bitmap by an OR operation between a number of bitmaps representing past time frames of the video image, calculating a fourth bitmap by performing a dilation process of the third bitmap representing the current time frame of the video image, and creating one or more frames identifying area of changes and movements in the
(Continued)

video image based on detecting BLOBs (Binary Large Objects) in the fourth bitmaps.

17 Claims, 4 Drawing Sheets

(51) Int. Cl.
  *G06T 5/30* (2006.01)
  *G06T 7/155* (2017.01)
  *G06V 10/34* (2022.01)

(52) U.S. Cl.
  CPC .... *G06V 10/34* (2022.01); *G06T 2207/10016* (2013.01); *G06T 2207/20021* (2013.01); *G06T 2207/20052* (2013.01)

(56) References Cited

U.S. PATENT DOCUMENTS

| | | | |
|---|---|---|---|
| 2010/0265344 A1* | 10/2010 | Velarde | H04N 5/783 348/222.1 |
| 2011/0268320 A1* | 11/2011 | Huang | G06V 20/41 382/103 |
| 2012/0213409 A1 | 8/2012 | El-Maleh et al. | |
| 2015/0139484 A1* | 5/2015 | Wu | G06T 7/254 382/103 |
| 2015/0334398 A1* | 11/2015 | Socek | H04N 19/182 375/240.26 |
| 2020/0160495 A1* | 5/2020 | Staranowicz | G06T 7/215 |

FOREIGN PATENT DOCUMENTS

| | | |
|---|---|---|
| WO | 2015175201 A1 | 11/2015 |
| WO | 2018026427 A1 | 2/2018 |

OTHER PUBLICATIONS

Lan J, Li J, Hu G, Ran B, Wang L. Vehicle speed measurement based on gray constraint optical flow algorithm. Optik. Jan. 1, 2014; 125(1):289-95. (Year: 2014).*
Norwegian Search Report dated Jan. 9, 2021, for corresponding Norwegian Patent Application No. 20200708 consisting of 3-pages.
International Type Search Report dated Dec. 14, 2020, for corresponding Norwegian Patent Application No. 20200708; consisting of 13-pages.
Babu et al., "A survey on compressed domain video analysis techniques", Multimed Tools Appl, (2016), vol. 75, pp. 1043-1078; consisting of 36-pages.
Fonseca et al., "Face Detection in the Compressed Domain", International Conference on Image Processing (ICIP), (2004), pp. 2015-2018; consisting of 4-pages.
Lee et al., "A Simple and Fast Color-Based Human Face Detection Scheme For Content-Based Indexing and Retrieval", International Conference on Image Processing (ICIP), (2004), pp. 702-704; consisting of 4-pages.
Long et al., "A Moving Object Segmentation in MPEG Compressed Domain Based on Motion Vectors and DCT Coefficients", Congress on Image and Signal Processing, Xi'an University of Technology, Chang'an University, 2008, pp. 605-609; consisting of 5-pages.
Ellis et al.,"Object Detection and Tracking in an Open and Dynamic World", Department of Electrical, Electronic and Information Engineering City University, Proceedings 2nd IEEE Int. Workshop on PETS, Dec. 9, 2001; consisting of 8-pages.

* cited by examiner

METHOD, COMPUTER PROGRAM AND SYSTEM FOR DETECTING CHANGES AND MOVING OBJECTS IN A VIDEO VIEW

CROSS-REFERENCE TO RELATED APPLICATION

This application is related to and claims priority to Norwegian Patent Application No. 20200708, filed on Jun. 17, 2020, entitled METHOD, COMPUTER PROGRAM AND SYSTEM FOR DETECTING CHANGES AND MOVING OBJECTS IN A VIDEO VIEW, the entirety of which is incorporated herein by reference.

FIELD

The present invention relates to detecting changes and moving objects in a video stream for identifying areas of interest.

BACKGROUND

Transmission of moving pictures in real-time is employed in several applications like e.g. video conferencing, net meetings and video telephony.

However, representing moving pictures requires bulk information as digital video is typically represented by up to 60 pictures each second, each picture represented by a large number of pixels, which in turn is represented by at least one byte of digital data. Such uncompressed video data results in large data volumes, and cannot be transferred over conventional communication networks and transmission lines in real time as it would require an unrealistic high network bandwidth.

Thus, real time video transmission video compression, where the main goal is to represent the video information with as few bits as possible, introducing as low latency as possible, and without compromising too much with video quality.

The most common video coding method is described in the MPEG*, H.26* and VP* standards. The video data undergo four main processes before transmission, namely prediction, transformation, quantization and entropy coding.

The prediction process significantly reduces the amount of bits required for each picture in a video sequence to be transferred. It takes advantage of the similarity of parts of the sequence with other parts of the sequence. Since the predictor part is known to both encoder and decoder, only the difference between the sequences has to be transferred. This difference typically requires much less capacity for its representation and is usually referred to as the residual. The residual represented as a block of data (e.g. 8×8 pixels) still contains internal correlation. A well-known method for taking advantage of this is to perform a two dimensional block transform. The VP9 protocol uses an 8×8 integer DCT (Discrete Cosine Transform) transform. This transforms 8×8 pixels into 8×8 transform coefficients that usually can be represented by fewer bits than the pixel representation.

Transform of a 8×8 array of pixels with internal correlation will likely result in a 8×8 block of transform coefficients with much fewer non-zero values than the original 8×8 pixel block.

New features are continuously introduced into video conferencing i.a. to increase user experience, and to extract big data and statistics to support machine learning. One such feature is Adaptive Composition (AD). This is a composite layout of a multi-view in a video conference that creates a cleaner, more balanced user interface on screen, with less shuffling of individual video feeds. For example, in AD, the views having the most number of humans detected will tend to be placed in the upper part of the screen. This requires some kind of face detection or face counting in each view. Face detection is a relatively costly process in terms of processor usage and time-consumption, as facial features like eyes and head shape should be recognized before stating that a face is present in a view. In real-time communication, this may introduce unacceptable delays and occupy to much of available processor capacity.

Therefore, there is a need for a method reducing processor and time consumption of face detection in real-time video communication, without compromising with face detection accuracy.

SUMMARY

In view of the above, an object of the present invention is to overcome or at least mitigate drawbacks of prior art video conferencing systems.

In a first aspect the invention provides a method of framing changes and movements in a video image divided into N×N blocks of pixel positions. The method comprising calculating a first bitmap representing a current time frame of the video image by a DCT (Discrete Cosine Transform) transform on each of the N×N blocks of pixel positions determining the extent of change in the respective N×N block by assigning a first one of a binary value to the pixel positions of the N×N blocks considered to have more than a predefined amount of change, and a second one of the binary value to the pixel positions of the N×N blocks considered to have less than a predefined amount of change; calculating a third bitmap representing the current time frame of the video image by performing an OR operation on a number of first bitmaps representing past time frames of the video image; calculating a fourth bitmap representing the current time frame of the video image by performing a dilation process of the third bitmap representing the current time frame of the video image; and creating one or more frames identifying area of changes and movements in the video image based on detecting BLOBs (Binary Large Objects) in the fourth bitmaps.

The calculation cost of reaching the frames is extremely low compared with conventional face detection processes, as only bitmaps representing the video image are used.

The method may further comprise the additional step of calculating a second bitmap representing the current time frame of the video image by performing an erosion process of the first bitmap representing the current time frame of the video image, and the step of calculating the third bitmap is by performing the OR operation on the number of first bitmaps representing past time frames of the video image is performed by an OR operation on a number of second bitmaps representing past time frames of the video image.

The erosion process may include performing a convolution between the first bitmap and the following first kernel:
0, 1, 0,
1, 1, 1,
0, 1, 0, The step of calculating the first bitmap may further include calculating DCT coefficients of each of the N×N dimensioned block in the video image; comparing each of the DCT coefficients of the N×N blocks with a predefined first threshold; if all or substantially all of the DCT coefficients of the N×N blocks are below a predefined first threshold, then the pixel positions of the respective N×N block is assigned to the second one of the binary value "0"; if not, the pixel positions of the respective N×N block is assigned to the first one of the binary value "1".

The dilution process may include performing a convolution between the third bitmap and the following second kernel:

1, 1, 1, 1, 1, 1, 1,
1, 1, 1, 1, 1, 1, 1,
1, 1, 1, 1, 1, 1, 1,
1, 1, 1, 1, 1, 1, 1,
1, 1, 1, 1, 1, 1, 1,
1, 1, 1, 1, 1, 1, 1,
1, 1, 1, 1, 1, 1, 1,

In one embodiment N=8.

In one embodiment, the number of first bitmaps representing past time frames may be 30.

The step of creating one or more frames identifying area of changes and movements may include extracting the respective left bottom and right top pixel positions of each of the detected BLOBs.

In a second aspect, the invention provides an image processing device for framing changes and movements in a video image divided into N×N blocks of pixel positions, comprising at least one processor, an input/output circuitry adapted to receive the video image, at least one memory, the memory comprising instructions that, when executed by the at least one processor, cause the image processing device to calculating a first bitmap representing a current time frame of the video image by a DCT transform on each of the N×N blocks of pixel positions determining the extent of change in the respective N×N block by assigning a first one of a binary value to the pixel positions of the N×N blocks considered to have more than a predefined amount of change, and a second one of the binary value to the pixel positions of the N×N blocks considered to have less than a predefined amount of change; calculating a third bitmap representing the current time frame of the video image by performing an OR operation one a number of first bitmaps representing past time frames of the video image; calculating a fourth bitmap representing the current time frame of the video image by performing a dilation process of the third bitmap representing the current time frame of the video image, and creating one or more frames identifying area of changes and movements in the video image based on detecting BLOBs (Binary Large Objects) in the fourth bitmaps.

The calculation cost of reaching the frames is extremely low compared with image processing devices performing conventional face detection processes, as only bitmaps representing the video image are used.

The instructions when executed by at least one processor may further cause the image processing device to perform the following additional step of calculating a second bitmap representing the current time frame of the video image by performing an erosion process of the first bitmap representing the current time frame of the video image, and the step of calculating the third bitmap is by performing the OR operation on the number of first bitmaps representing past time frames of the video image is performed by an OR operation on the number of second bitmaps representing past time frames of the video image.

The erosion process may include performing a convolution between the first bitmap and the following first kernel:

0, 1, 0,
1, 1, 1,
0, 1, 0,

Calculating the first bitmap may further include calculating DCT coefficients of each of the N×N dimensioned block in the video image, comparing each of the DCT coefficients of the N×N blocks with a predefined first threshold; if all or substantially all of the DCT coefficients of the N×N blocks are below a predefined first threshold, then the pixel positions of the respective N×N block is assigned to the second one of the binary value "0"; if not, the pixel positions of the respective N×N block is assigned to the first one of the binary value "1".

The dilution process may include performing a convolution between the third bitmap and the following second kernel:

1, 1, 1, 1, 1, 1, 1,
1, 1, 1, 1, 1, 1, 1,
1, 1, 1, 1, 1, 1, 1,
1, 1, 1, 1, 1, 1, 1,
1, 1, 1, 1, 1, 1, 1,
1, 1, 1, 1, 1, 1, 1,
1, 1, 1, 1, 1, 1, 1,

In one embodiment N=8.

In one embodiment, the number of first bitmaps representing past time frames may be 30.

Creating one or more frames identifying area of changes and movements may include extracting the respective left bottom and right top pixel positions of each of the detected BLOBs.

In a third aspect, the invention provides a computer program product comprising a non-transitory computer readable storage medium comprising instructions that, when executed on a processor in an image processing device enables the image processing device to perform the steps of the method of the first aspect.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

According to embodiments of the present invention as disclosed herein, the above-mentioned disadvantages of solutions according to prior art are eliminated or at least mitigated.

According to some aspects of the present invention, a stepwise method of identifying areas of interest within a view in a video stream that may be subject to face detection or face detection update is provided. It is based on identifying substantial movements and changes in the image.

The first step takes advantageous of existing techniques within conventional video compression to identify blocks that can be "skipped" in the encoding and decoding process because there are substantially no changes present.

As already indicated, one characteristic of video content to be encoded is that the bit-requirements to describe each sequence are strongly varying. For several applications it is well known for a person skilled in the art that the content of a considerable part of a picture is unchanged from frame to frame.

H.264/H.265 and VP9 widens this definition so that parts of the picture with constant motion may also be coded without use of additional information. Regions with little or no change from frame to frame require a minimum number of bits to be represented. The blocks included in regions with little or no change from frame to frame are defined as "skipped" or to be in "skip mode", reflecting that no changes or only predictable motion relative to the corresponding previous blocks occur. Other than an indication that the blocks are to be decoded as "skipped", no data is required for representing these blocks. This indication may be common to several macro blocks.

This is utilized by the present invention by calculating DCT (Discrete Cosine Transform) coefficients of each of the N×N dimensioned block in the picture and comparing each of the DCT coefficients of the N×N blocks with a predefined first threshold. If all the DCT coefficients of the N×N blocks are below a predefined first threshold, then the respective N×N block is assigned a "0". If not, the respective N×N block is assigned an "1". The assigning may be the other way around, but the result would in either case be a binary representation of the picture, showing where there have been changes, and consequently where in the picture it is likely that there are or just have been movements.

This binary representation resulting from the early skip DCT transform tends to be a bit noisy and to include possible unwanted high frequency components. This is, according to aspects of the present invention, adjusted for by using convolution matrixes. In image processing, a kernel, a convolution matrix, or a mask is a small matrix used for blurring, sharpening, embossing, edge detection, and more. The noise and the possible high frequency components can be reduced by doing a convolution between a kernel and an image or an image like content. Convolution is the process of adding each element of the image to its local neighbors, weighted by the kernel. This is related to a form of mathematical convolution. The matrix operation being performed—convolution—is not traditional matrix multiplication, despite being similarly denoted by "*".

In a second step according to aspects of the present invention, the binary representation resulting from the early skip DCT representation undergoes a convolution with a kernel adjusted to eroding the content, so as to remove some of the noise and possible unwanted spatial high frequency components of the binary early skip representation. An erosion kernel will do that by actually compute a local minimum over the area covered by the kernel. As an example, if the zeros in the early skip DCT representation are black, and the non-zeros are white, the erosion kernel will result in that the white areas get thinner and smaller, and the black areas get bigger.

So far, the present invention has been discussed on a single video frame level, where changes are relative to the previous frame or a reference frame. However, the movements in the picture of interest should reflect changes over a certain period of time, and not just a snapshot of the change, i.e. to reduce flashing high frequency components in dimension of time. Therefore, the result of the erosion operation is in a third step combined for a certain number of frames back in time. The number of frames should be large enough to reduce the high frequencies, but at the same time small enough to avoid unwanted "tales" of historic changes. The number of eroded frames may e.g. undergo an OR operation to create the wanted combination of changes in a predefined time window.

The resulting bitmap after the above discussed operations may still represent moving objects in a fragmented way, i.e. through several adjacent areas separated by narrow paths of discontinuities. Instead the required result would be a moving object represented as coherent as possible to be able to create a best possible matching frame around a candidate area subjected to e.g. face detection.

In certain aspect of the present invention, a dilation step is performed. Dilation of bitmaps add pixels to the boundaries of objects in an image, as opposed to the above discussed erosion, which removes pixels on object boundaries. In particular, the bitmaps undergoes a convolution with a kernel adjusted to dilating the content, so as to stich the possible separated fragments representing one moving object. The number of pixels added by this process depends on the size and shape of the selected kernel, but to achieve the desired result, the inventors have realized that the dilation kernel should be large relative to the erosion kernel.

To actually identify the resulting moving objects in the bitmap, a so-called BLOB (Binary Large Objects) detection step is performed. In Image processing, BLOB detection refers to modules that are aimed at detecting points and/or regions in the image that differ in properties like brightness or color compared to the surrounding regions of the image.

After having detected the BLOBs, frames of the assumed moving objects are defined by the respective minimum and maximum horizontal and vertical pixel positions of each of the detected BLOBs.

Figure 1:
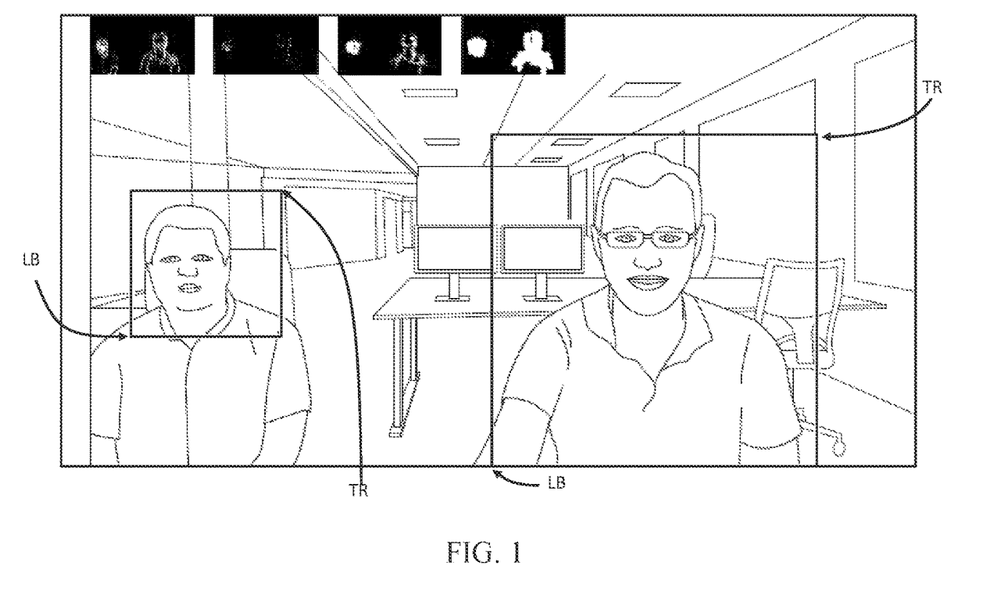
FIG. 1 is a schematic illustration of a method steps of processing a video image.

Turning now to an example according to aspects of the present invention, FIG. 1 is a snapshot of a video image where two frames are indicating an area of interest for face detection. The frames are found using the above discussed method for change identification and movement detection. As can be seen, the frames enclose two faces in the image. Face detection processing is excluded from all other areas except from within the frames, resulting in a significant reduction in processing power and delay. After having framed the areas of interest as described above, a conventional face detection process would achieve a face hit more or less immediately due to the limited search area. The calculation leading to the finding the framed areas of interest requires on the other hand very little processing because it is just handling bit map representations of the image.

FIGS. 2-5 are illustrations of bitmaps representing the different steps of detecting movements in the picture of FIG. 1.

Figure 2:
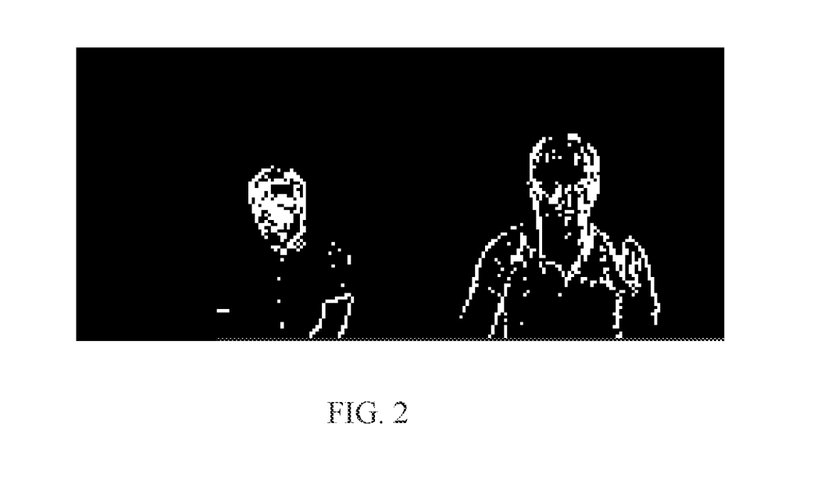
FIG. 2 is a schematic illustration of one method step of processing a video image.

In FIG. 2, the video image has been subjected to the above discussed early skip DCT transform. The pixels in blocks having DCT coefficients below (or possibly equal) a predefined first threshold are black, and pixels in blocks having DCT coefficients above (or possibly equal) a predefined first threshold are white. As can be seen, the resulting first bitmap is an outline of two moving portraits in the image.

Figure 3:
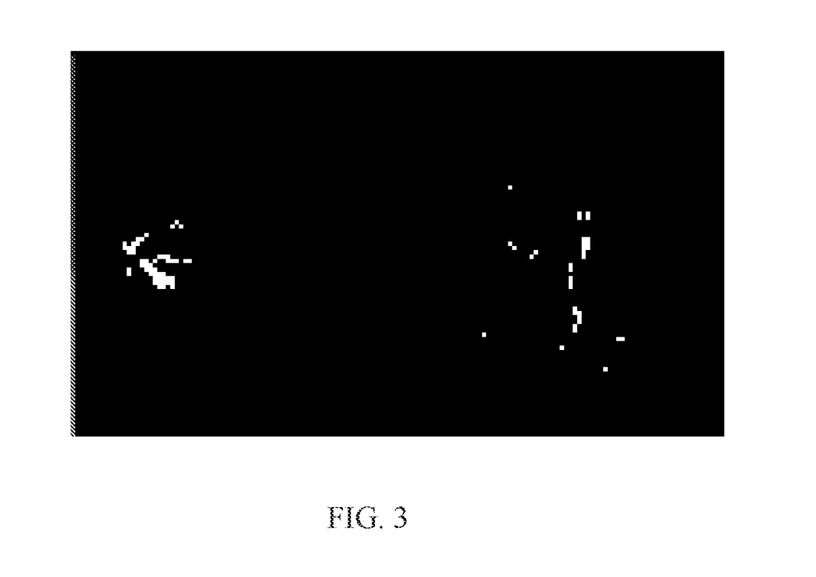
FIG. 3 is a schematic illustration of one method step of processing a video image.

A second bitmap is shown in FIG. 3 illustrating the result of the first bitmap being subjected to erosion according to the above discussion of the second step. In particular, the first bitmap has undergone a convolution with the following first kernel:

```
uint8_t kernel_mask_3x3[ ] = {
    0, 1, 0,
```

```
        1, 1, 1,
        0, 1, 0,
    };
```

As can be seen, the resulting second bitmap is a stripped down version of the first bitmaps maintaining just the spatial low frequency content of the first bitmap.

Figure 4:
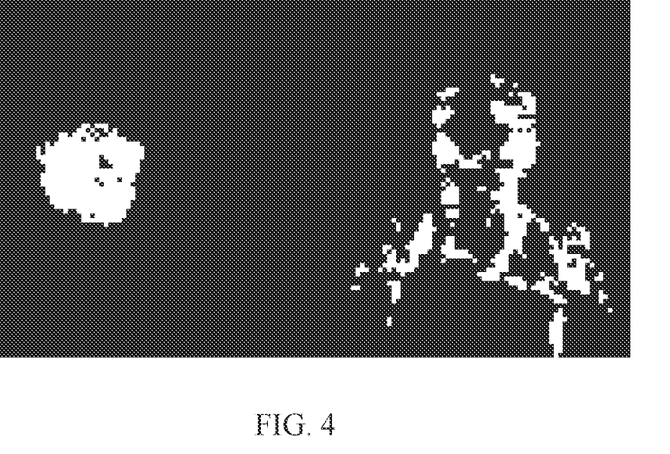
FIG. 4 is a schematic illustration of one method step of processing a video image.

FIG. 4 illustrates a third bitmap resulting from an OR-process of the thirty most recent second bitmaps representing the corresponding thirty most recent video frames according to the third step discussed above. The resulting third bitmap representing combined changes over a is time window at 30 fps (frames per second).

Figure 5:
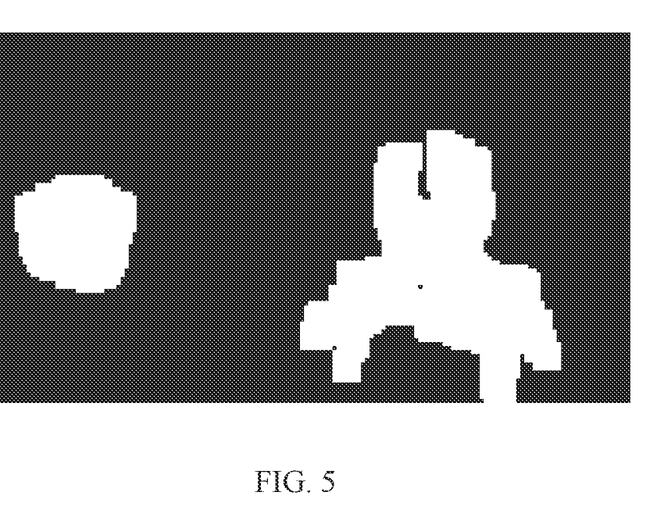
FIG. 5 is a schematic illustration of one method step of processing a video image.

FIG. 5 illustrates the result of the dilation step of the third bitmap as discussed above. In particular, the third bitmap has undergone a convolution with the following second kernel:

```
uint8_t kernel_mask_7x7[ ] = {
    1, 1, 1, 1, 1, 1, 1,
    1, 1, 1, 1, 1, 1, 1,
    1, 1, 1, 1, 1, 1, 1,
    1, 1, 1, 1, 1, 1, 1,
    1, 1, 1, 1, 1, 1, 1,
    1, 1, 1, 1, 1, 1, 1,
    1, 1, 1, 1, 1, 1, 1,
};
```

As can be seen, separated objects possibly constituting one moving object have been stitched together.

Finally, BLOBs according to the above discussed BLOB detecting step is performed, extracting the respective left bottom LB and right top RT pixel positions of each of the detected BLOBs, resulting in the frames illustrated in FIG. 1.

The calculation cost of reaching the frames is extremely low compared with conventional face detection processes, as only bitmaps representing the video image are used. As movements or changes in the areas outside the frames are unlikely to have occurred, it is also unlikely that there are faces present outside the frames due to the fact that faces of awake and alive humans are never completely still. The area to be subjected to high cost face detection algorithms is therefore limited to within the frames, resulting in a tremendous gain in terms of processor and time usage, which is particularly important in real-time video communication.

The area of interest can be limited even more by storing the previous areas where faces have been detected. New face detections in these areas would then be superfluous in at least a certain amount of time after having been detected.

Further, the present invention can also be utilized to detect and frame gestures; such as hand movements. Detected gestures could then be used as indication of activity, which again could change the position of the video image in a composite video picture as an alternative to voice activation.

Figure 6:
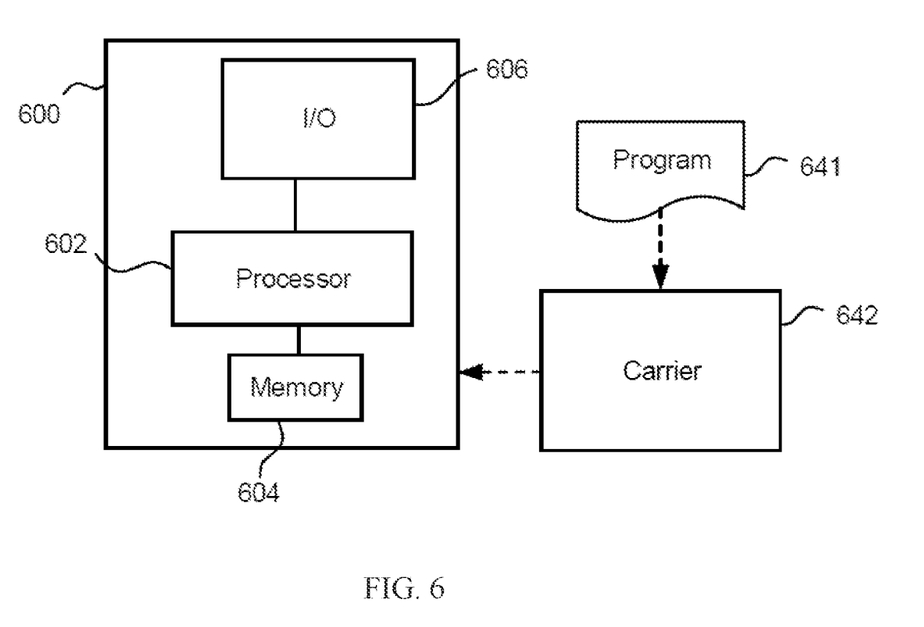
FIG. 6 is a schematic illustration of an image processing device.

Turning now to FIG. 6, a schematically illustrated image processing device 600. The image processing device 600 comprises an input/output circuitry 606, at least one processor 602 and a memory 604. The memory 604 contains instructions executable by the processor 602, cause the image processing device 600 to calculating a first bitmap representing a current time frame of the video image by a DCT transform on each of the N×N blocks of pixel positions determining the extent of change in the respective N×N block by assigning a first one of a binary value to the pixel positions of the N×N blocks considered to have more than a predefined amount of change, and a second one of a binary value to the pixel positions of the N×N blocks considered to have less than a predefined amount of change, calculating a third bitmap representing the current video image by performing an OR operation between a number of first bitmaps representing past time frames of the video image, calculating a fourth bitmap representing the current video time frame by performing a dilation process of the third bitmap representing the current video time frame, and creating one or more frames identifying area of changes and movements in the video image based on detecting BLOBs (Binary Large Objects) in the fourth bitmaps.

The instructions that are executable by the processor 602 may be software in the form of a computer program 641. The computer program 641 may be contained in or by a carrier 642, which may provide the computer program 641 to the memory 604 and processor 602. The carrier 642 may be in any suitable form including an electronic signal, an optical signal, a radio signal or a computer readable storage medium.

In the preceding description, various aspects of the method and imaging processing device according to the invention have been described with reference to the illustrative embodiment. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the method and image processing device, which are apparent to persons skilled in the art to which the disclosed subject matter pertains, are deemed to lie within the scope of the present invention.

What is claimed is:

1. A method of framing changes and movements in a video image divided into N×N blocks of pixel positions, comprising:

calculating a first bitmap representing a current time frame of the video image by a DCT (Discrete Cosine Transform-) transform on each of the N×N blocks of pixel positions by determining the extent of change in the respective N×N block by assigning a first one of a binary value to the pixel positions of the N×N blocks considered to have more than a predefined amount of change, and a second one of the binary value to the pixel positions of the N×N blocks considered to have less than a predefined amount of change;

calculating a third bitmap representing the current time frame of the video image by performing an OR operation on a number of first bitmaps representing past time frames of the video image;

calculating a fourth bitmap representing the current time frame of the video image by performing a dilation process of the third bitmap representing the current time frame of the video image; and creating one or more frames identifying area of changes and movements in the video image based on detecting BLOBs (Binary Large Objects) in the fourth bitmaps.

2. The method of claim 1, further comprising:

calculating a second bitmap representing the current time frame of the video image by performing an erosion process of the first bitmap representing the current time frame of the video image, and the step of calculating the third bitmap by performing the OR operation on the number of first bitmaps representing past time frames of the video image is performed by an OR operation on a number of second bitmaps representing past time frames of the video image.

3. The method of claim 2, wherein the erosion process includes performing a convolution between the first bitmap and the following first kernel:
0, 1, 0,
1, 1, 1,
0, 1, 0.

4. The method of claim 1, wherein the step of calculating the first bitmap further includes:
 calculating DCT coefficients of each of the N×N dimensioned block in the video image,
 comparing each of the DCT coefficients of the N×N blocks with a predefined first threshold,
 if all or substantially all of the DCT coefficients of the N×N blocks are below the predefined first threshold, then the pixel positions of the respective N×N block is assigned to the second one of the binary value "0",
 if not, the pixel positions of the respective N×N block is assigned to the first one of the binary value "1".

5. The method of claim 1, wherein the dilution dilation process includes performing a convolution between the third bitmap and the following second kernel:
1, 1, 1, 1, 1, 1,
1, 1, 1, 1, 1, 1,
1, 1, 1, 1, 1, 1,
1, 1, 1, 1, 1, 1,
1, 1, 1, 1, 1, 1,
1, 1, 1, 1, 1, 1,
1, 1, 1, 1, 1, 1.

6. The method of claim 1, wherein N=8.

7. The method of claim 1, wherein the number of first bitmaps representing past time frames is 30.

8. The method of claim 1, wherein the step of creating one or more frames identifying area of changes and movements includes extracting a respective left bottom (LB) and right top (RT) pixel positions of each of the detected BLOBs.

9. An image processing device for framing changes and movements in a video image divided into N×N blocks of pixel positions, comprising
 at least one processor,
 an input/output circuitry adapted to receive the video image,
 at least one memory,
 the memory comprising instructions that, when executed by the at least one processor, cause the image processing device to:
 calculating a first bitmap representing a current time frame of the video image by a DCT transform on each of the N×N blocks of pixel positions by determining the extent of change in the respective N×N block by assigning a first one of a binary value to the pixel positions of the N×N blocks considered to have more than a predefined amount of change, and a second one of the binary value to the pixel positions of the N×N blocks considered to have less than a predefined amount of change,
 calculating a third bitmap representing the current time frame of the video image by performing an OR operation one a number of first bitmaps representing past time frames of the video image,
 calculating a fourth bitmap representing the current time frame of the video image by performing a dilation process of the third bitmap representing the current time frame of the video image,
 creating one or more frames identifying area of changes and movements in the video image based on detecting BLOBs (Binary Large Objects) in the fourth bitmaps.

10. The image processing device of claim 9, wherein the instructions when executed by at least one processor, further causes the image processing device to perform the following additional step:
 calculating a second bitmap representing the current time frame of the video image by performing an erosion process of the first bitmap representing the current time frame of the video image, and the step of calculating the third bitmap by performing the OR operation on the number of first bitmaps representing past time frames of the video image is performed by an OR operation on a number of second bitmaps representing past time frames of the video image.

11. The image processing device of claim 10, wherein the erosion process includes performing a convolution between the first bitmap and the following first kernel:
0, 1, 0,
1, 1, 1,
0, 1, 0.

12. The image processing device of claim 9, wherein the step of calculating the first bitmap further includes:
 calculating DCT coefficients of each of the N×N dimensioned block in the video image,
 comparing each of the DCT coefficients of the N×N blocks with a predefined first threshold,
 if all or substantially all of the DCT coefficients of the N×N blocks are below the predefined first threshold, then the pixel positions of the respective N×N block is assigned to the second one of the binary value "0",
 if not, the pixel positions of the respective N×N block is assigned to the first one of the binary value "1".

13. The image processing device of claim 9, wherein the dilation process includes performing a convolution between the third bitmap and the following second kernel:
1, 1, 1, 1, 1, 1, 1,
1, 1, 1, 1, 1, 1, 1,
1, 1, 1, 1, 1, 1, 1,
1, 1, 1, 1, 1, 1, 1,
1, 1, 1, 1, 1, 1, 1,
1, 1, 1, 1, 1, 1, 1,
1, 1, 1, 1, 1, 1, 1.

14. The image processing device of claim 9, wherein N=8.

15. The image processing device of claim 9, wherein the number of first bitmaps representing past time frames is 30.

16. The image processing device of claim 9, wherein the step of creating one or more frames identifying area of changes and movements includes extracting a respective left bottom (LB) and right top (RT) pixel positions of each of the detected BLOBs.

17. A computer program product comprising a non-transitory computer readable storage medium comprising instructions that, when executed on a processor in an image processing device, enables the image processing device to perform the steps of the method according to claim 1.

* * * * *